United States Patent [19]

Hua et al.

[11] Patent Number: 5,486,752
[45] Date of Patent: Jan. 23, 1996

[54] ZERO-CURRENT TRANSITION PWM CONVERTERS

[75] Inventors: Guichao C. Hua; Fred C. Lee, both of Blacksburg, Va.

[73] Assignees: Center for Innovative Technology\*\*, Herndon; Virginia Polytechnic Institute-State university; Virginia Tech Intellectual Properties, Inc., both of Blacksburg, all of Va.

[21] Appl. No.: 262,049

[22] Filed: Jun. 17, 1994

[51] Int. Cl.[6] ................................. H02M 3/335
[52] U.S. Cl. ..................... 323/222; 363/21; 363/16; 323/282
[58] Field of Search ........................ 323/222, 223, 323/229, 230, 232; 363/41, 16, 20–21

[56] References Cited

U.S. PATENT DOCUMENTS 4,857,822  8/1989  Tabisz et al. ................ 323/282
5,262,930  11/1993  Hua et al. ................... 363/21
5,287,261  2/1994  Ehsani ....................... 363/124

*Primary Examiner*—Peter S. Wong
*Assistant Examiner*—Aditya Krishnan
*Attorney, Agent, or Firm*—Whitham, Curtis, Whitham & McGinn

[57] ABSTRACT

A zero-current transition pulse-width modulated (ZCT-PWM) d.c.-d.c. converter allows minority-carrier semiconductor devices such as, for example, bipolar junction transistors (BJTs), insulated gate bipolar transistors (IGBTs), MOSFET controlled thyristors (MCTs), and gate turn-off thyristors (GTOs), to be used as switches for high-power, high frequency applications. The ZCT-PWM converter comprises a shunt resonant branch inserted into a conventional PWM converter circuit. The resonant branch comprises a resonant inductor (Lr), a resonant capacitor (Cr), an auxiliary switch (S1), and an auxiliary diode (D1). The resonant branch is only active during a relatively short switching time in order to create a zero-current switch condition for the main pulse-modulating switch (S) without substantially increasing voltage or current stresses.

15 Claims, 6 Drawing Sheets

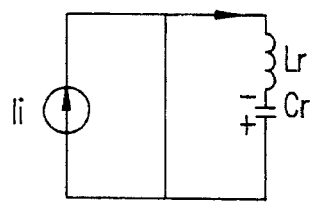
FIG.2A T0-T1
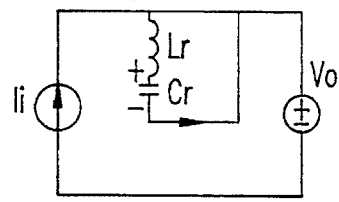
FIG.2B T1-T2
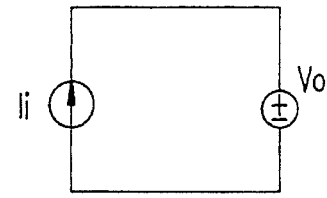
FIG.2C T2-T3
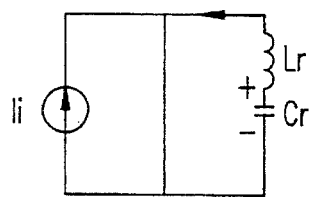
FIG.2D T3-T4
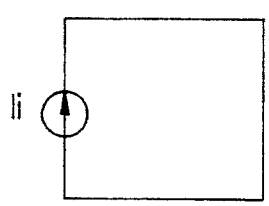
FIG.2E T4-T5
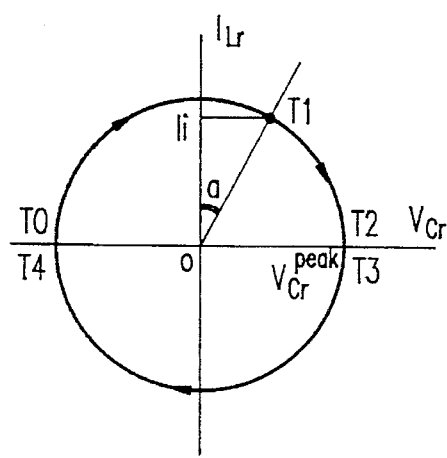
FIG.3

ZERO-CURRENT TRANSITION PWM CONVERTERS

BACKGROUND OF THE INVENTION

1. Field of the Invention

The present invention generally relates to soft-switching, pulse-width modulated (PWM) converters and, more particularly, to novel zero-current transition pulse-width modulated (ZCT-PWM) d.c. to d.c. converter suitable tier high power, high switching frequency applications where minority-carrier type semiconductor devices are used as switches.

2. Description of the Prior Art

Operating pulse-width modulated converts at high frequencies is highly desirable as it affords great weight and size reduction of the converter for a given power. Unfortunately, switching losses, component stresses, and noise due to parasitic oscillations are inherent problems with PWM technology which limit, as a practical matter, the frequency at which a PWM converter can be operated. Soft-switching technologies, such as, for example zero-voltage-switching, quasi-resonant converters (ZVS-QRC), were developed which eliminated much of the switching losses and parasitic oscillations associated with PWM converters and allowed higher operating frequencies to be achieved. Unfortunately, ZVS-QRC converters have additional drawbacks as they create high voltage stress on certain components, have a limited operational load range, and produce a variable switching frequency. U.S. Pat. No. 5,262,930 to Hua et al. shows a zero-voltage transition PWM (ZVT-PWM) d.c. to d.c. converter that employs a auxiliary switch that periodically kills converter resonance and thereby eliminates many of the above mentioned problems associated with soft-switching PWM converters. The ZVT-PWM converter of Hua et al. is deemed attractive when majority-carder type switching devices, namely MOSFETs, are used as the power switch.

Modern minority-carrier devices, such as, for example, bipolar junction transistors (BJTs), insulated gate bipolar transistors (IGBTs), MOSFET controlled thyristors (MCTs), and gate turn-off thyristors (GTOs) exhibit notable switching characteristics as well as low conduction losses and low cost. For these reasons minority carder devices are gaining wide acceptance in switched-mode power converter and invertor applications. Unfortunately, minority-carrier devices exhibit a current tail at turn-off which causes considerable high turn-off switching losses. Prior art ZVS techniques may be used, to a limited extent, to reduce minority carder device switching losses. In short, ZVS reduces the capacitive turn-on and turn-off switching losses by slowing down the voltage rise anti reducing the overlap between the switch voltage and switch current. While ZVS techniques are somewhat effective when applied to fast minority carrier devices with relatively small current tails, zero-current switching (ZCS) has been deemed more effective than ZVS in reducing minority carrier switching losses, particularly for slower devices. Several ZCS techniques are known. For example, conventional resonant converters, such as the parallel-resonant converter, series-resonant converter, and LCC-type converters, achieve ZCS for power transistors when operated below the resonant frequency. Additionally, constant-frequency operation is achievable in full-bridge topologies if phase-shift control is employed. Similarly, ZCS techniques eliminate switch voltage and current overlap by forcing the switch current to zero before the switch voltage rises.

However, prior art circuits applying these techniques are usually operated with large amounts of circulating energy and thus require bulky resonant components and other high voltage and current rated power devices to achieve the higher power ratings achieved by conventional PWM techniques. As a compromise between the ZCS resonant and PWM techniques, the ZCS quasi-resonant (ZCS-QRC) technique was developed. While the underlying power conversion principle of ZCS-QRCs is similar to that of the PWM converters, a resonant network is employed to shape the switch current waveform so that the power transistor is operated with ZCS and a rectifier diode with ZVS. Compared with the conventional resonant converters, the ZCS-QRCs operate with less circulating energy. However, these converters operate with sinusoidal current through the power switches which results in high peak and root mean square (rms) currents for the power transistors and high voltage stresses on the rectifier diodes. Furthermore, when the line voltage or load current varies over a wide range, ZCS-QRCs is modulated with a wide switching frequency range, making the circuit design difficult to optimize.

SUMMARY OF THE INVENTION

It is therefore an object of the present invention to provide zero-current-transition (ZCT) PWM direct-current to direct-current power converter using minority carrier switching devices for high-frequency, high-power applications.

It is yet another object of the present invention to provide a ZCT-PWM converter having zero-current turn-off for switching devices without substantially increasing switch voltage or current stresses.

The ZCT-PWM converter of the present invention contemplates introducing a resonant branch into a PWM converter. The resonant branch comprises a resonant inductor, a resonant capacitor, an auxiliary switch, and an auxiliary diode. The resonant branch is only active during a relatively short switching time in order to create a zero-current switch condition for the main switch.

BRIEF DESCRIPTION OF THE DRAWINGS

The foregoing and other objects, aspects and advantages will be better understood from the following detailed description of a preferred embodiment of the invention with reference to the drawings, in which:

FIGS. 2a through 2e are equivalent circuit diagrams for the circuit shown in FIG. 1 at five topological stages;

FIG. 3 is a state-plane trajectory of a resonant tank;

DETAILED DESCRIPTION OF A PREFERRED EMBODIMENT OF THE INVENTION

Figure 1A:
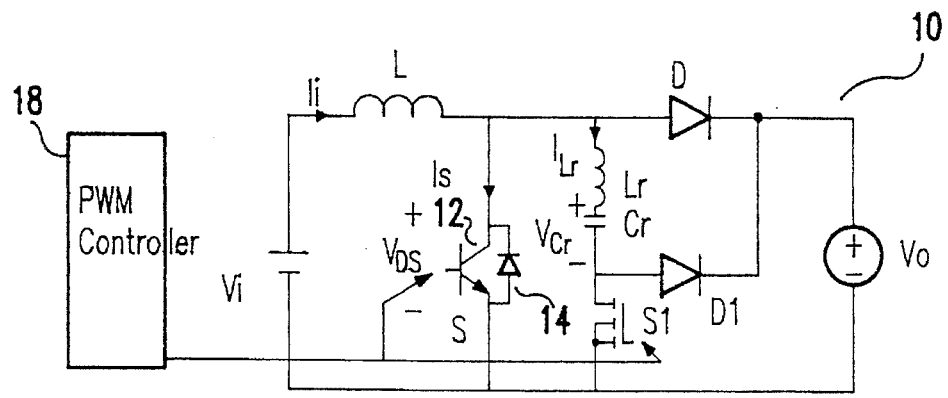
FIG. 1a is a circuit diagram for a ZCT-PWM boost converter.
Figure 1B:
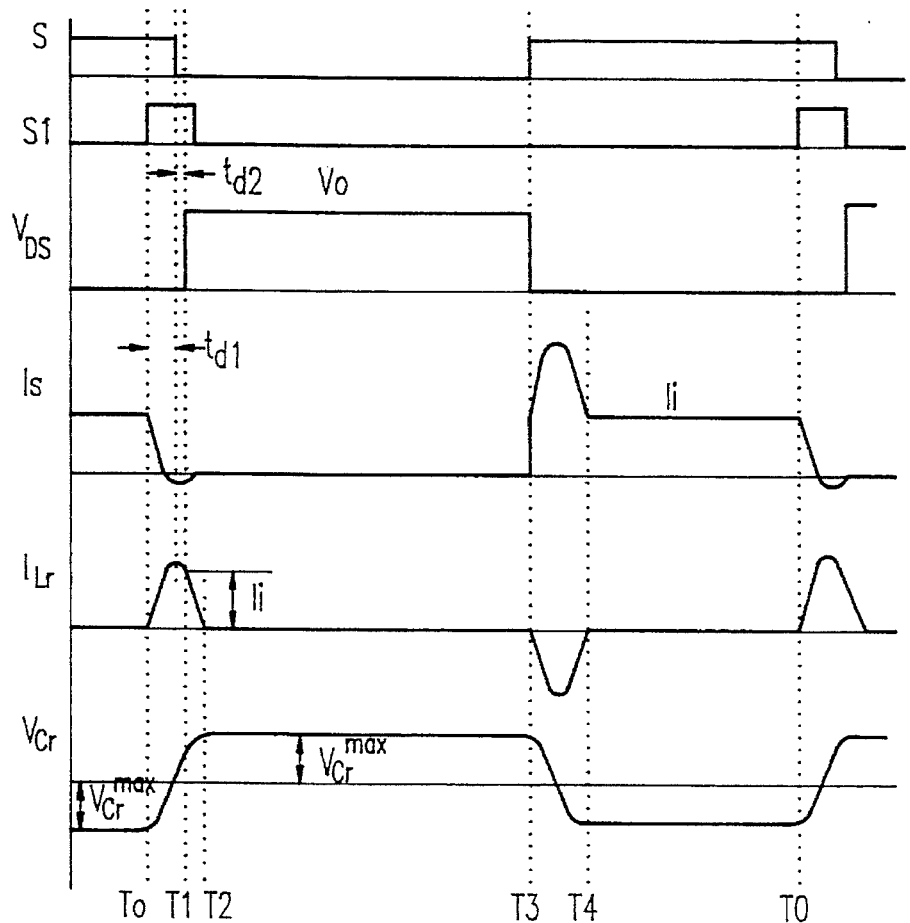
FIG. 1b is a key waveform timing diagram according to the invention.

Referring now to the drawings, and more particularly to FIG. 1, there is shown a circuit diagram for a ZCT-PWM boost converter circuit according to the invention, generally referred to as reference number 10. The circuit comprises a conventional PWM converter having a voltage source Vi, a main switch S (comprised of a minority carrier device shown as BJT 12 and a diode 14), an inductor L, and a diode D. Added to the conventional PWM converter is a novel resonant branch comprising a resonant inductor Lr, a resonant capacitor Cr, an auxiliary switch S1 and an auxiliary diode D1. A PWM controller 18 controls the switching patterns of the main switch S and the auxiliary switch S1 to achieve a desired d.c. to d.c. conversion between $V_i$ and $V_o$. Such PWM controllers 18 are well known in the art and could be, for example, a commercially available UC-3823. The resonant branch is only active for a short switching transition time to create a zero-current switch condition for the main switch S. The boost inductor, L is assumed to be large enough to be considered as a current source, Ii.

Referring now to FIGS. 2*a*–*e*, in steady-state, five operating stages exist within one switching cycle:

(a) $T_0$–$T_1$: Prior to $T_0$, the main switch, S, is conducting, and C, is charged with certain negative voltage, $-V_{CR}^{Peak}$. At $T_0$ the auxiliary switch S1 is turned on, starting a resonance between Cr and Lr. This resonance forces the transistor current through BJT 12 of the main switch S to decrease in a sinusoidal fashion. After a quarter of the resonant period, $t_{d1}$, the voltage across the resonant capacitor Cr reduces to zero, and current through the resonant inductor Lr reaches its maximum value, $I_{LR}^{max}$. This is given by:

$$t_{d1} = \frac{1}{4} T_r \quad (1)$$

and $$I_{Lr}^{max} = \frac{V_{Cr}^{peak}}{Z_r} \quad (2)$$

where $T_r = 2\pi(L_r C_r)^{1/2}$ and $Z_r = (L_r/C_r)^{1/2}$ are the resonant period and impedance of the resonant tank, respectively. It can be seen that to achieve ZCS for the transistor, $I_{LR}^{peak}$ has to be greater than $I_i$. After the transistor current drops to zero and its anti-parallel diode 14 starts to conduct, the gate drive signal of S is disabled at $t=t_0+t_{d1}$.

(b) $T_1$–$T_2$: S1 is turned off shortly after S is turned off. In steady-state operation, the resonant inductor current at $T_1$ is always equal to $I_i$. Thus the time delay between these two gate-drive turn-off signals, $t_{d2}$ determines the peak voltage of Cr and is given by:

$$V_{Cr}^{peak} = \frac{Z_r I_i}{\cos\left(\frac{2\pi t_{d2}}{T_r}\right)} \quad (3)$$

if $$V_{Cr}^{peak} \leq V_o \quad (4)$$

In steady-state operation, $V_{CR}^{Peak}$ cannot exceed $V_o$, since D1 would otherwise conduct during operating stage $T_4$–$T_0$. Defining $\alpha = 2\pi(T_{d2}/T_r)$ Equation (3) becomes:

$$V_{Cr}^{peak} = \frac{Z_r I_r}{\cos\alpha} \quad (5)$$

Combining Equations 2 through 5 yields:

$$I_{Lr}^{max} = \frac{I_i}{\cos\alpha} \geq I_i \quad (6)$$

which means that as long as inequality (4) is satisfied, ZCS operation will guaranteed regardless of the input voltage and load current. In a practical design, $T_{d2}$ can be selected at around $0.45T_r$, so that $I_{Lr}^{Peak}$ is about 10% higher than $I_i$, and ZCS is ensured. When S1 is turned off at T1, both D and D1 will start to conduct, and $L_r$ and $C_r$ continue to resonate until the $I_{LR}$ current decays to zero at T2.

(c) $T_2$–$T_3$: At $T_2$, $L_r$ and $C_r$ complete the half-cycle resonance, and D1 is reverse-biased. This operating stage is identical to the transistor-off stage of the PWM boost converter.

(d) $T_3$–$T_4$: At $T_3$, S is turned on, and the boost inductor is charged by the input voltage. Meanwhile, $C_r$ and $L_r$ form a half-cycle resonance through S and the anti-parallel diode 14 of S1, which reverses the polarity of the Cr voltage.

(e) $T_4$–$T_0$: Operation of the circuit is identical to that of the transistor-on period of the PWM boost converter. At $T_0$, S1 is turned on again, and the switching cycle is repeated.

In steady-state operation, the energy stored in the resonant tank remains constant over the entire switching cycle. During each topological stage, shown in FIG. 2, either the voltage across the resonant tank ($L_r$ plus $C_r$) is zero or the current through the resonant tank is zero, so there is no energy transfer between the resonant elements and other parts of the circuit. FIG. 3 shows the state-plane trajectory of the resonant tank. The energy stored in the resonant tank, which is self-adjusted in accordance with line and load conditions is given by:

$$E_{res} = \frac{1}{2} L_r \left(\frac{I_i}{\cos\alpha}\right)^2 \quad (7)$$

This circulating energy increases as input current increases (i.e. when line voltage decreases or load current increases). In a practical circuit, since the resonant transition time is very short with respect to the switching cycle, the resonant inductance is very small as compared to boost inductance. Therefore, the circulating energy of the ZCT-PWM converter is quite small compared to a conventional ZCS resonant converter.

Figures 4A, 4B:
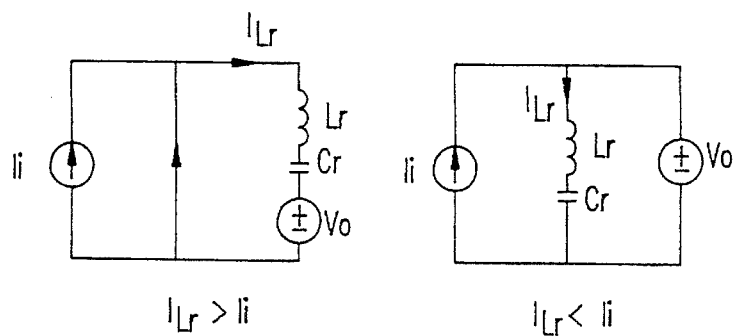
FIGS. 4a through 4b are two additional topological stages which occur when the circuit shown in FIG. 1 operates at $I_{LR}>I_i$, and $I_{LR}<I_i$, respectively, at $T_2$.

Referring now to FIG. 4, an additional topological stage occurs when the circuit offsets the balance operating point: (a) $I_{LR} > I_i$, and (b) $I_{LR} < I_i$, at $T_2$. Above, it was noted that in steady-state operation, the resonant inductor current at $T_1$ is always equal to $I_i$, regardless of line or load condition change. Assuming that for some reason $I_{Lr}$ at $T_1$ is larger than $I_i$. In this case, there will be an additional topological stage inserted between stage (b) and stage (c) of FIG. 2, shown in FIG. 4(*a*). During this operating stage, the resonant branch transports energy to a load at $V_o$. Hence, the energy stored in the resonant branch decreases. In contrast, if $I_{Lr}$ at $T_1$ is lower than $I_i$, there will be another topological stage inserted between stage (b) and stage (c) of FIG. 2, shown in FIG. 4(*b*). It can be seen that under these conditions the boost inductor L of FIG. 1 will pump some energy into the resonant branch. Hence, the energy stored in the resonant branch will increase until it reaches the balance point given by Equation (7).

In steady-state operation, the ZCT-PWM technique implements ZCS turn-off for the main switch S power transistor 12 without penalizing the voltage stresses of both the power transistor 12 and the rectifier diode D. Although the main switch current $I_s$ waveform exhibits a resonant peaking, it does not increase the conduction loss, since the average current through the power transistor 12 is essentially the same compared with its PWM counter part. Another unique advantage of the proposed technique is that it has minimum circulating energy. Equation (7) reveals that regardless of the line and load changes, the energy stored in the resonant tank will always be adaptively adjusted so that it is only slightly higher than what is needed for creating the ZCS condition.

Figure 5A:
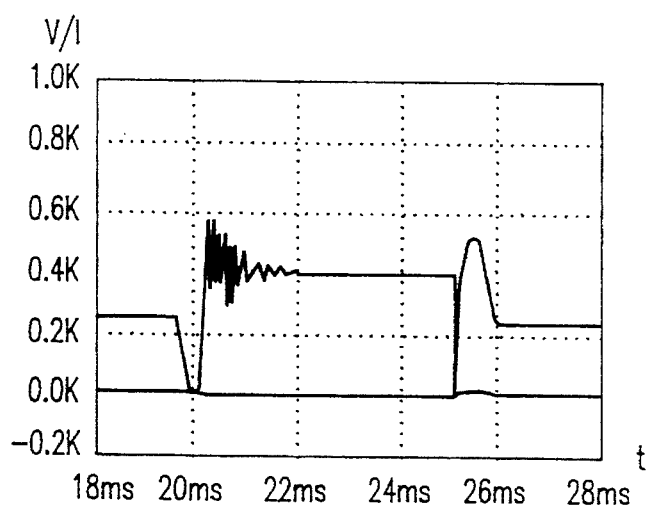
FIGS. 5a through 5b are transistor voltage vs. current waveforms using an additional inductor for damping reverse-recovery of the diode with the ZCT-PWM technique and PWM technique, respectively.
Figure 5B:
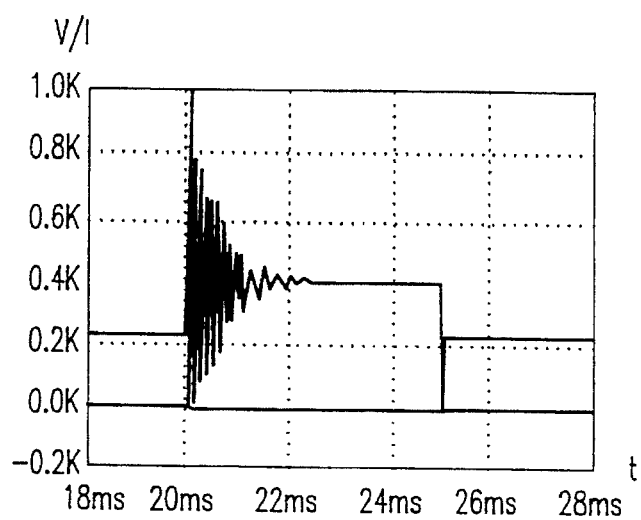

Referring now to FIGS. 5a and 5b there is shown a power transistor's $V_{DS}$ and $I_s$ waveforms of a boost converter with the ZCT-PWM technique, and with a prior art PWM technique, respectively. For high-voltage applications (such as power-factor correction) where the diode D suffers from a severe reverse-recovery problem, an additional inductor (or a saturable inductor) in series with the rectifier diode D or the main switch S is usually used to suppress the reverse-recovery problem. At transistor 12 turn-off, this inductor invokes a high-voltage spike on the transistor 12 due to high di/dt across the inductor. To suppress this voltage spike, a large dissipative snubber is frequently used. For a ZCT boost converter with the same additional inductor, however, this voltage spike is much reduced due to controlled di/dt across the inductor at transistor 12 turn-off. As a result, a much smaller snubber can be used to absorb this ringing.

ZCT can be applied to various circuit topologies. From the circuit topological point of view, every resonant-type converter (including the conventional resonant, quasi-resonant, and multi-resonant can be viewed as a variation of a basic PWM counterpart. By incorporating certain types of resonant networks, it creates a resonance to achieve ZVS or ZCS. For different resonant converters, of course, the type of resonant network employed is different. One common characteristic of resonant-type topologies is that they all employ a resonant inductor (sometimes a resonant inductor plus a resonant capacitor) in series with the power switch or the rectifier diode to shape switch voltage/current waveforms. Soft-switching is achieved by utilizing the resonance between this resonant inductor and certain resonant capacitors, which are usually in parallel with the semiconductor devices. Due to the fact that these resonant elements are placed in the main power path, the resultant resonant converters are always subjected to inherent limitations. First, since the resonant inductor is subjected to hi-directional voltage, it inevitably generates additional voltage stress on the semiconductor devices. Second, since all the power flows through the resonant inductor, substantial circulating energy is always created, which significantly increases conduction losses. In addition, the energy stored in the resonant inductor strongly depends on the line voltage and load current. Therefore, soft-switching condition is sensitive to line voltage and load current changes. This is why most resonant converters are unable to maintain soft-switching for a wide line and load range.

To alleviate the above-mentioned limitations, it is necessary to remove resonant elements from the main power path. Instead of using a series resonant element, an alternative way is to use a shunt resonant element(s) across the power switch. During the switching transition, the shunt resonant network is activated to create a partial resonance to achieve ZVS or ZCS. When switching transition is over, the circuit simply reverts back to the familiar PWM operating mode. In this way, the converter can achieve soft-switching while preserving the advantages of the PWM converter. It should be mentioned that ZCT can be implemented in perhaps a number of different ways. One should keep it in mind that it is desirable to minimize the circulating energy and circuit complexity. Furthermore, it also is desirable to implement some form of soft-switching for the auxiliary switch as well.

Figure 6A:
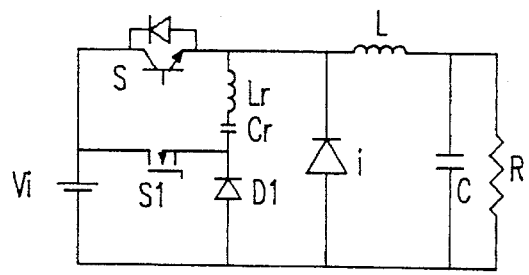
FIGS. 6a through 6f are circuit diagrams showing six different ZCT-PWM topologies.
Figure 6B:
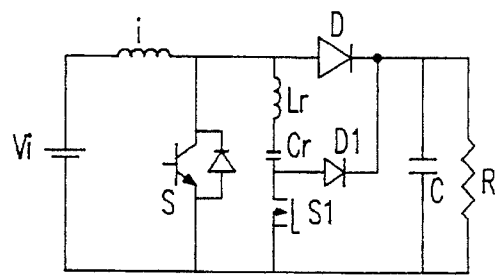
Figure 6C:
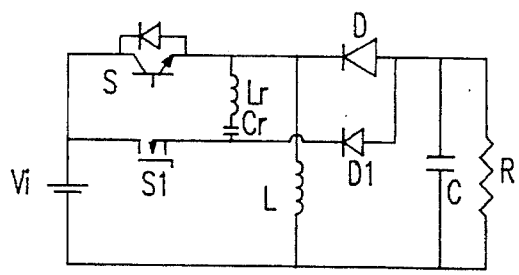
Figure 6D:
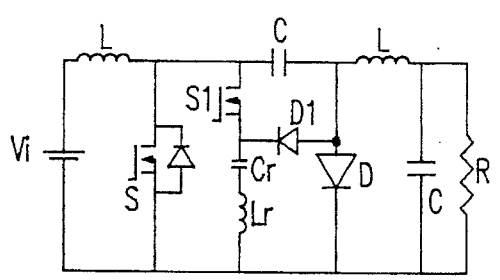
Figure 6E:
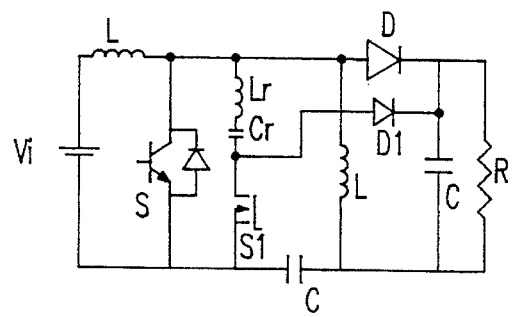
Figure 6F:
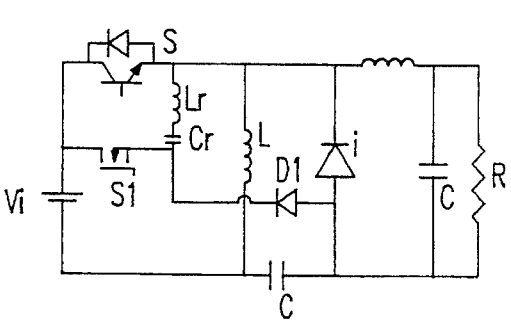
Figure 7:
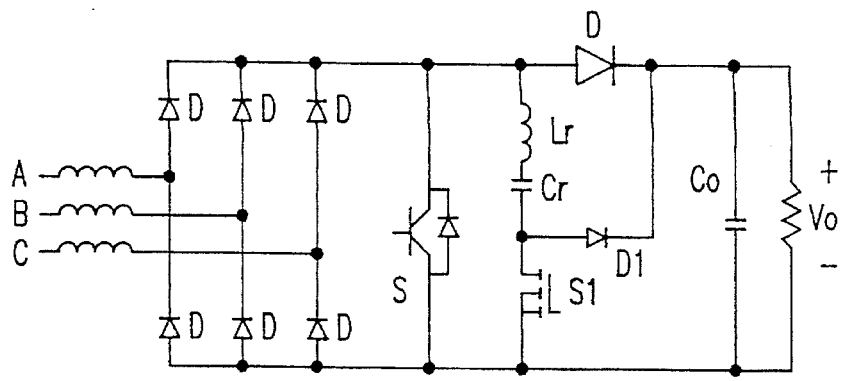
FIG. 7 is a circuit diagram of a simple three-phase ZCT-PWM boost converter.
Figure 8:
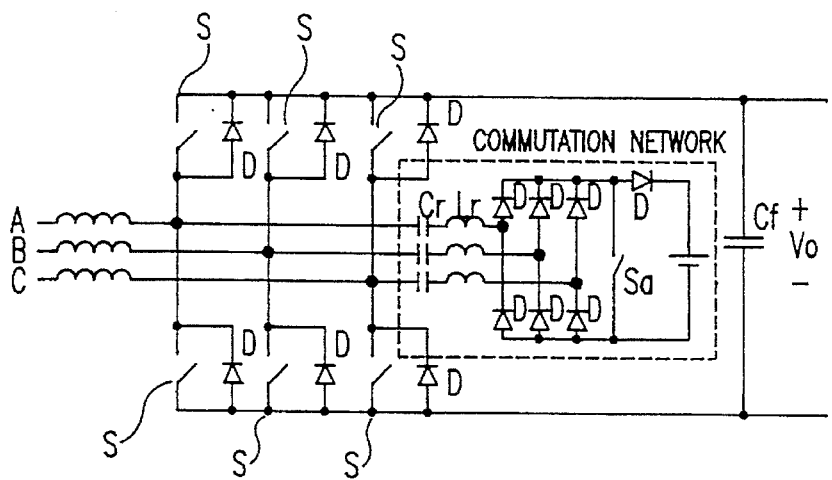
FIG. 8 is a three-phase ZCT-PWM boost rectifier/invertor.

The ZCT concept can be extended to any switched-mode power converters or inverters simply by introducing a resonant branch into the circuit, a new family of ZCT converters can be derived. Six basic ZCT-PWM topologies are shown in FIG. 6. FIG. 6a shows a buck converter, FIG. 6b shows a boost converter, FIG. 6c shows a buck-boost converter, FIG. 6d shows a cuk converter, FIG. 6e shows a sepic, and FIG. 6f shows a zeta converter. FIG. 7 shows a single-switch three-phase ZCT-PWM boost converter. This circuit can provide good power factor with simple fixed-frequency and fixed-duty-cycle control. The use of the shunt resonant branch (comprising Lr, Cr, D1 and S1) enables the circuit to operate at much higher switching frequencies. FIG. 8 shows a three-phase ZCT-PWM boost rectifier/invertor which can be operated in continuous conduction mode. For this converter, employing a small resonant commutation network can implement ZCS for all six power transistors S. The benefits of the ZCT-PWM converters include ZCS for the power switch, low voltage/current stresses of the power switch and rectifier diode, minimal circulating energy, wide line and load ranges for ZCS, constant-frequency operation.

Figure 9:
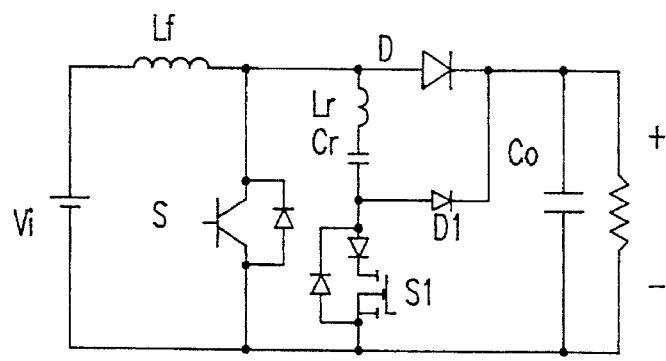
FIG. 9 is a power stage circuit diagram of a 100 kHz, 1 kW ZCT boost converter.
Figure 10A:
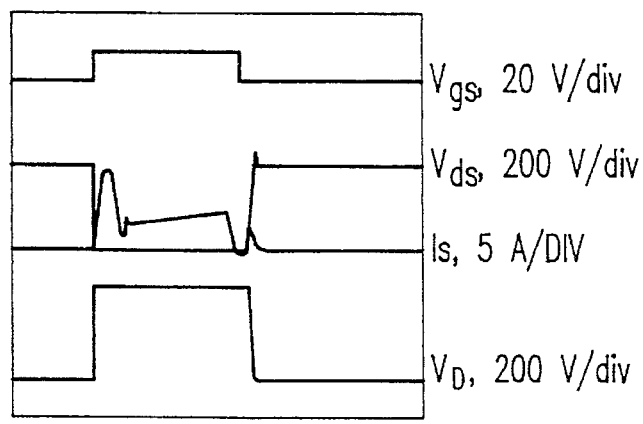
FIGS. 10*a* through 10*b* are oscillograms of two IGBT boost converters using the ZCT-PWM technique and PWM technique, respectively.
Figure 10B:
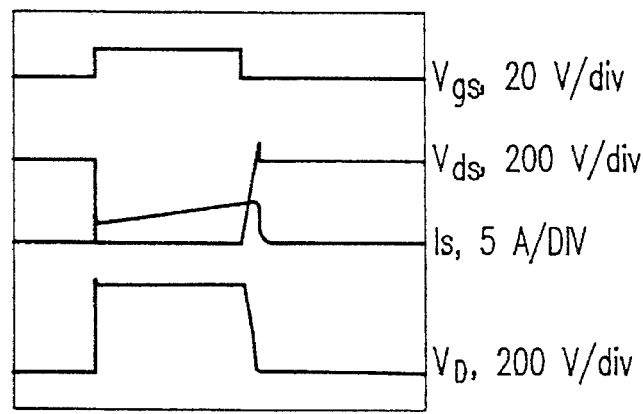
Figure 11:
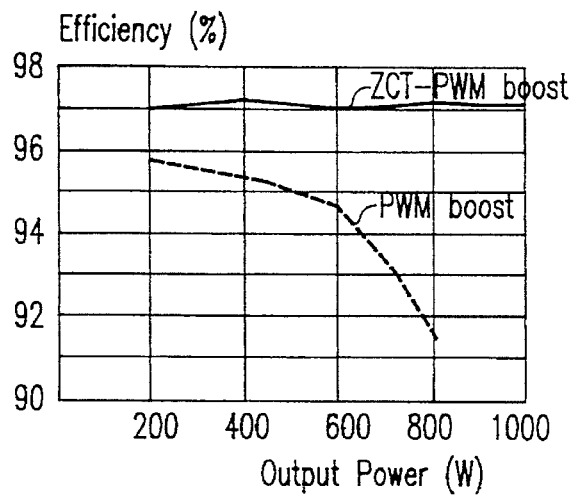
FIG. 11 is a diagram showing and efficiency comparison of a IGBT switch boost converter using the ZCT-PWM technique and PWM technique.

Referring now to FIG. 9, a 100 kHz, 1 kW PWM boost converter was modified with a resonant branch for ZCT according to the present invention. The circuit was regulated at 400 V output with a 200–300 V input range. The main power switch is implemented by an IR fast-series IGBT, IRGPC50F ($V_{CE}$=600 V, $I_c$=40A, $t_r$=37 ns, and $T_f$=420 ns, rated for up to 8 kHz switching frequency operation). Since the auxiliary switch S1 only handles a little resonant transition energy, a small MOSFET, IRF830, is employed. The small diode 16 in series with S1 is used to block its slow body-diode from conduction. Lr and Cr are selected at 10 uH and 8.2 nF, respectively. It is shown that ZCS is always maintained when the line voltage or load current changes in a wide range. As shown in FIG. 10, the oscillogram of the ZCT-PWM boost operating at 250 V input and 700 W output (FIG. 10a) is compared to waveforms of an unmodified PWM circuit operating under the same conditions (FIG. 10b). It can be seen that the IGBT turn-off current tail is essentially alleviated. FIG. 11 shows the efficiency measurements of ZCT and PWM boost converters. It can be seen that the ZCT technique significantly improves the efficiency. Due to the high turn-off switching loss of the IGBT device, the hard-switched PWM circuit is not able to operate above 800 W output power. For the ZCT circuit, power losses involved in the operation of the auxiliary resonant shunt are only about 1.8 W, which is less than 0.3% of the output power.

While the invention has been described in terms of a single preferred embodiment, those skilled in the art will recognize that the invention can be practiced with modification within the spirit and scope of the appended claims.

We claim:

1. A pulse-width-modulated d.c to d.c. converter, comprising:

a d.c. voltage input means;

a d.c. voltage output means;

a pulse-width modulating switch electrically connected between said d.c. voltage input means and said d.c. voltage output means;

a resonant branch connected between said d.c. voltage input means and said d.c. voltage output means, said resonant branch comprising a resonant inductor connected directly in series with a resonant capacitor;

an auxiliary switch means for electrically connecting and electrically disconnecting said resonant branch from said d.c. voltage input means and said d.c. voltage output means; and a diode having a first connection between said resonant capacitor and said auxiliary switch means, and a second connection connected to said d.c. voltage output means, said auxiliary switch means electrically connecting said resonant branch between said d.c. voltage input means and said d.c. voltage output means during a period when said pulse-width modulating switch is switching from an on-state to an off-state to create a zero-current condition in said pulse-width modulating switch.

2. A pulse-width-modulated d.c to d.c. converter as recited in claim 1 wherein said pulse-width modulating switch is a minority carrier device.

3. A pulse-width-modulated d.c to d.c. converter as recited in claim 2 wherein said minority carrier device is an insulted gate bipolar transistor.

4. A pulse-width-modulated d.c to d.c. converter as recited in claim 2 wherein said minority carrier device is a MOSFET controlled thyristor.

5. A pulse-width-modulated d.c to d.c. converter as recited in claim 2 wherein said minority carrier device is a gate turn-off thyristor.

6. A pulse-width-modulated d.c to d.c. converter as recited in claim 2 wherein said minority carrier device is a bipolar junction transistor.

7. A pulse-width-modulated d.c to d.c. converter as recited in claim 1 further comprising a pulse-width-modulating controller means for controlling the switching patterns of said pulse-width-modulated switch and said auxiliary switch.

8. A method for eliminating switching current through a semiconductor pulse-width-modulating switching device in a pulse-width-modulating converter, comprising the steps of:

placing a resonant shunt branch between an input node and an output node of said pulse-width-modulating converter;

activating an auxiliary switch in said resonant shunt branch while said pulse-width-modulating switch is conducting, said auxiliary switch causing a resonant current between a resonant capacitor and a resonant inductor to reduce electrical current through said pulse-width-modulating switch to zero; and deactivating said auxiliary switch after said pulse-width-modulating switch ceases conducting.

9. A method for eliminating switching current through a semiconductor switching device in a pulse-width-modulating converter as recited in claim 8 wherein said pulse-width-modulating switching device is a minority carrier type semiconductor device.

10. A method for eliminating switching current through a semiconductor switching device in a pulse-width-modulating converter as recited in claim 9 wherein said minority carrier type semiconductor device is an insulted gate bipolar transistor.

11. A method for eliminating switching current through a semiconductor switching device in a pulse-width-modulating converter as recited in claim 9 wherein said minority carrier type semiconductor device is an bipolar junction transistor.

12. A method for eliminating switching current through a semiconductor switching device in a pulse-width-modulating converter as recited in claim 9 wherein said minority carrier type semiconductor device is a MOSFET controlled thyristor.

13. A method for eliminating switching current through a semiconductor switching device in a pulse-width-modulating converter as recited in claim 9 wherein said minority carrier type semiconductor device is a gate turn-off thyristor.

14. A pulse-width-modulated converter, comprising:

a poly-phase input means;

a d.c. voltage output means;

a pulse-width modulating switch electrically connected between said poly-phase input means and said d.c. voltage output means;

a resonant branch connected between said poly-phase input means and said d.c. voltage output means; and an auxiliary switch means for electrically connecting and electrically disconnecting said resonant branch from said poly-phase input means and said d.c. voltage output means, said auxiliary switch means electrically connecting said resonant branch between said poly-phase input means and said d.c. voltage output means during a period when said pulse-width modulating switch is switching from an on-state to an off-state whereby a zero-current condition is created in said pulse-width modulating switch.

15. A pulse-width-modulated converter as recited in claim 14 further comprising a plurality of resonant branches connected between said poly-phase input means and said d.c. voltage output means.

* * * * *